United States Patent [19]

Martin

[11] 3,724,858

[45] Apr. 3, 1973

[54] TAPE RECORDER APPARATUS

[75] Inventor: William A. Martin, Rochester, N.Y.

[73] Assignee: Eastman Kodak Company, Rochester, N.Y.

[22] Filed: July 22, 1970

[21] Appl. No.: 57,264

[52] U.S. Cl. .......................................................274/4
[51] Int. Cl. ................................................G11b 5/00
[58] Field of Search .....242/198, 199, 200; 274/4, 11

[56] References Cited

UNITED STATES PATENTS

| | | | |
|---|---|---|---|
| 3,439,184 | 4/1969 | Neapolitakis | 274/11 B |
| 3,610,497 | 10/1971 | Ban | 274/11 B |
| 3,485,963 | 12/1969 | Murata | 242/198 X |
| 3,460,782 | 8/1969 | Findeisen | 274/4 C X |
| 3,421,767 | 1/1969 | Atsumi | 274/4 R |
| 3,488,112 | 1/1970 | Hickl | 352/72 |
| 2,485,575 | 10/1949 | Deaver | 274/9 B |

*Primary Examiner*—Harry N. Haroian
*Attorney*—Robert W. Hampton and Milton S. Sales

[57] ABSTRACT

A magnetic tape recorder for use in conjunction with a motion picture camera is provided with a compact portable housing having a door which may be opened to permit insertion of, or removal of, a tape cassette or cartridge. A cam mechanism operates in conjunction with the door whereby, when the door is opened, the record heads and a pressure roller which cooperates with the tape driving capstan are automatically withdrawn from their normal positions for easy removal or insertion of the cassette. The recorder is provided with an interlock system to prevent operation of an associated cine camera unless a cassette is received in the recorder and the door has been closed.

3 Claims, 12 Drawing Figures

WILLIAM A. MARTIN
INVENTOR.

BY Milton S. Sales
Robert W. Hampton
ATTORNEYS

WILLIAM A. MARTIN
INVENTOR.

BY Milton S. Sales
Robert W. Hampton
ATTORNEYS

FIG. 5
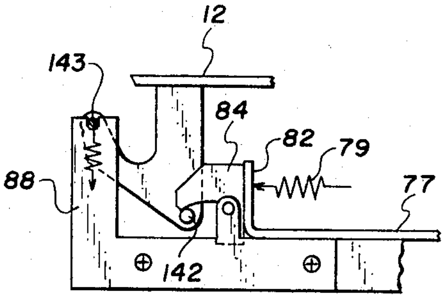
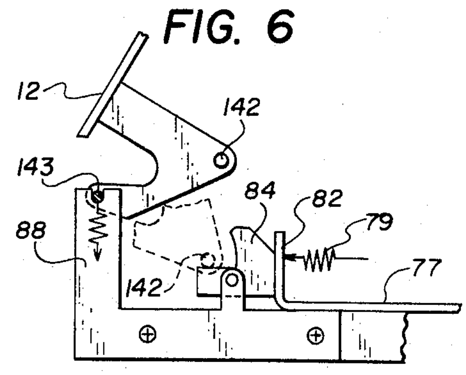
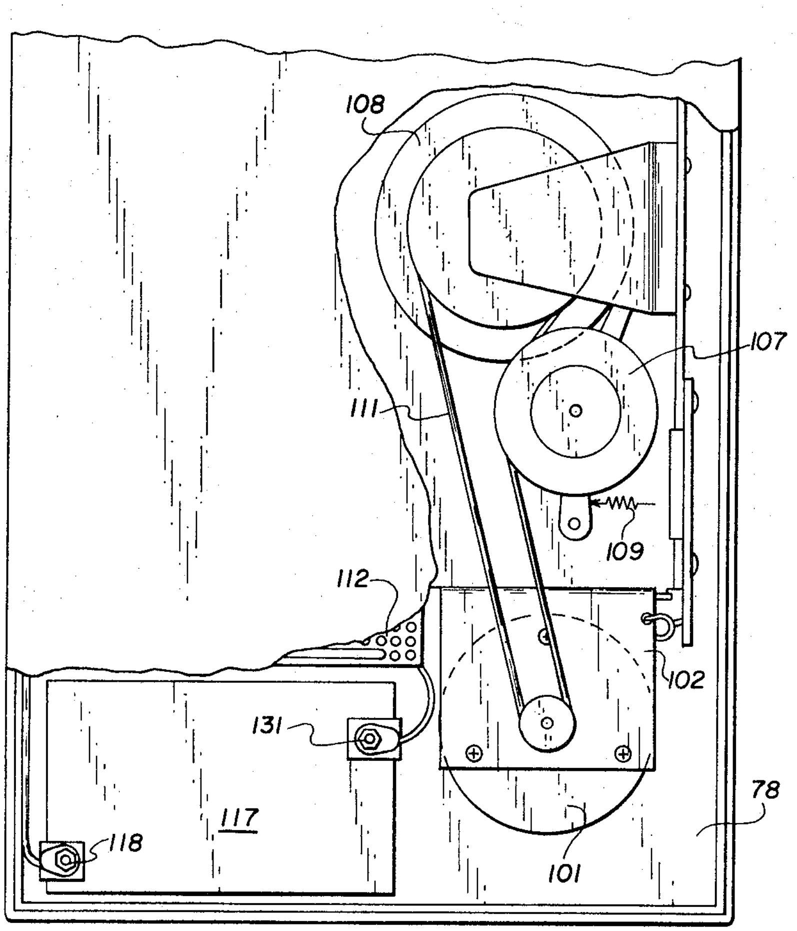
FIG. 7
WILLIAM A. MARTIN
INVENTOR.
BY Milton S. Sales
Robert W. Hampton
ATTORNEYS

WILLIAM A. MARTIN
INVENTOR.

BY Milton S. Sales
Robert W. Hampton
ATTORNEYS

WILLIAM A. MARTIN
INVENTOR.

BY Milton S. Sales
Robert W. Hampton
ATTORNEYS

WILLIAM A. MARTIN
INVENTOR.

BY Milton S. Sales
Robert W. Hampton

ATTORNEYS

TAPE RECORDER APPARATUS

BACKGROUND OF THE INVENTION

1. Field of the Invention

The present invention relates to magnetic tape recorders, and more particularly to a portable tape recorder for use in conjunction with a motion picture camera for production of a sound motion picture film.

2. Description of the Prior Art

As is well known, so-called "home movies" have become increasingly popular in recent years due largely to the fact that simply operated and reasonably priced equipment for the purpose has become readily available. However, these recordings have heretofore been predominately of the "silent" type since inclusion of sound recording means in conjunction with the picture taking has, as a rule, not only involved substantially increased costs but has also resulted in adding considerably to the tasks of the operator. For example, extreme care has been required in controlling the camera and the sound recorder to attain proper synchronization of the sound and picture, as well as making sure that the camera and recorder are operated together. For example, the operator must make sure that through error the recorder is not started without the camera, and vice versa.

Since efficiently operating portable magnetic tape recorders have become available, frequent attempts to operate such recorders in conjunction with movie cameras have been made, often with quite satisfactory results. However, many problems have been encountered. For example, the problem of proper synchronization mentioned above as well as the necessity of providing complicated interlocking means for preventing the operation of one element without the other.

U.S. Pat. No. 3,460,782, issued Aug. 12, 1969, to H. H. Findeisen discloses a tape recorder, portable to a degree, wherein a series of slides, movable when the cover is closed, are utilized to move tape guide rollers to bring the tape into engagement with the recording and playback heads. U.S. Pat. No. 3,278,251, issued Oct. 11, 1966, to O. Freudenschuss, discloses an arrangement for the synchronous recording of pictures and sound which includes switching means whereby the recorder can be controlled by starting and stopping the camera. However, even with the advantages resulting from knowledge of the teachings of such patents as these, many problems still remain in connection with the production of sound motion pictures of the home type.

SUMMARY OF THE INVENTION

Accordingly, it is an object of he present invention to facilitate the production of sound motion pictures, particularly of the home type, and to eliminate many sources of operator error.

Another object of the present invention is to facilitate the loading of a tape cassette in a portable tape recorder as well.

In accordance with a specific illustrative embodiment of my invention, a magnetic tape recording mechanism is completely enclosed in a compact housing so designed that the recording mechanism is completely enclosed and protected at all times when the recording mechanism is in use. A door is provided which may be opened to give access to the interior of the housing, and a novel cam arrangement is included which is operated by opening and closing movements of the door. When the door is opened, the cam mechanism functions to automatically move the record heads away from their normal contacting position with respect to the cassette tape as well as to move a pressure roller away from its normal position with respect to the tape driving capstan. This novel function is provided to facilitate placement of a cassette in the housing and removal of the cassette therefrom upon completion of the program recording.

A dual-interlock arrangement is provided comprising a first switch closed upon insertion of a cassette in the housing in record position, and a second switch closed when the door of the housing is closed. These switches are connected as series elements in the operating path of the recorder and it is obvious, therefore, that operation of the recorder is possible only when, first, a cassette is in record position in the housing and, second, when the door of the housing is closed. In order to further reduce the opportunity for operator error, the novel arrangement is such that both recorder and camera are operated under control of the single element. In one embodiment this common control element is the camera trigger while, in a second embodiment, the common control element is a microphone switch.

A further feature of the invention is the complete elimination from the recorder of the various operator-controlled buttons customarily provided on magnetic tape recorders but not needed for use in conjunction with a camera as contemplated herein.

The invention, and its objects and advantages, will become more apparent in the detailed description of the preferred embodiments presented below.

BRIEF DESCRIPTION OF THE DRAWING

The above and other objects and advantages of the present invention will become apparent to one skilled in the art from the following detailed description read in conjunction with the attached drawings wherein like reference numerals indicate like elements and wherein:

FIG. 5 shows the position of the door lever and cam when the housing door is closed;

FIG. 6 shows the position of the door lever and cam when the housing door is open;

FIG. 7 is a rear elevational view of the recorder shown in FIG. 1 showing particularly the drive arrangement for the tape spindle and capstan;

DESCRIPTION OF THE PREFERRED EMBODIMENT

Figures 1, 2:
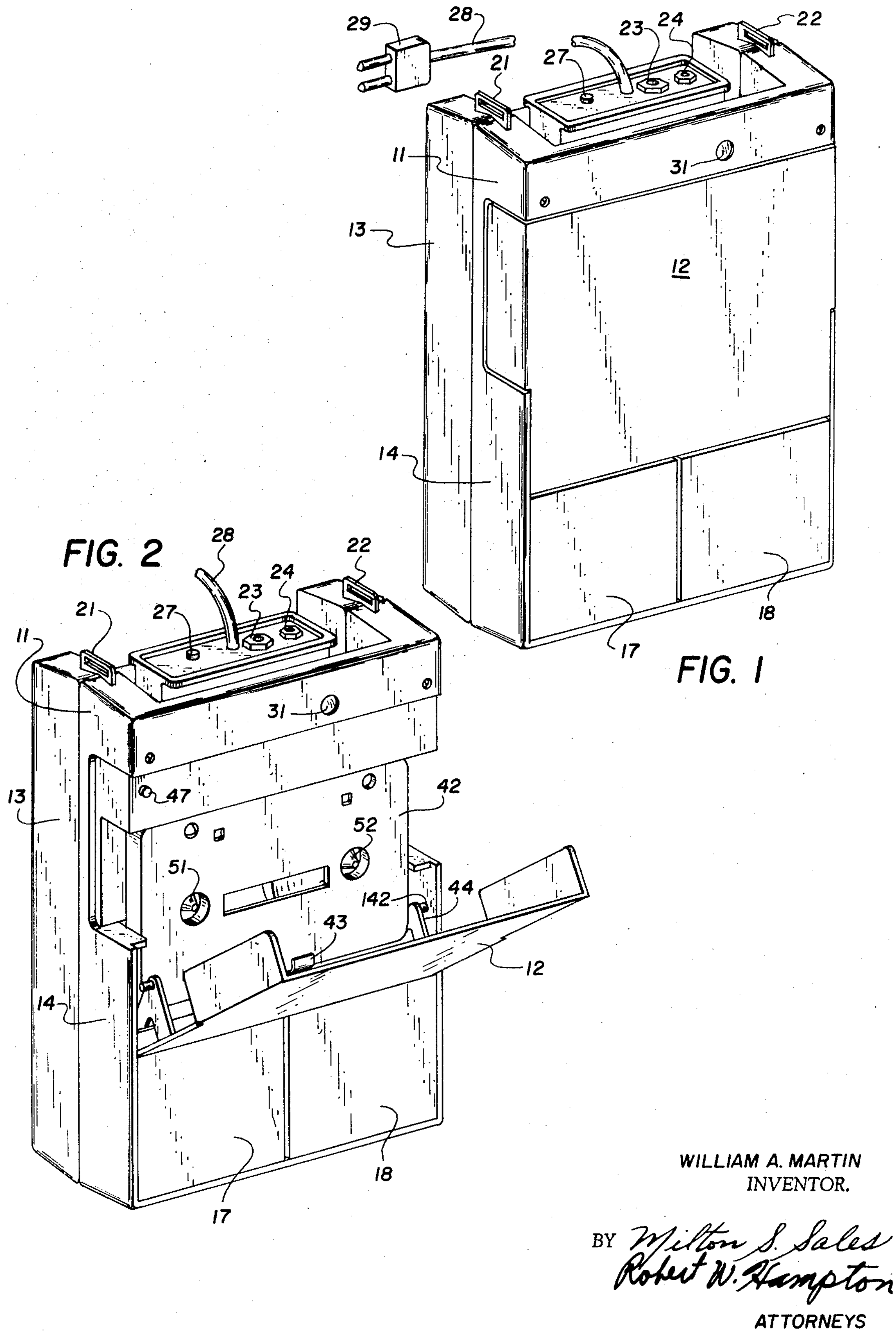
FIG. 1 is a pictorial view of a portable magnetic tape recorder as contemplated by a specific illustrative embodiment of the invention, the door of the housing being closed.
FIG. 2 is a pictorial view of the recorder of FIG. 1, the door being open and a tape cassette being loaded in the housing.

Referring now to the drawing and first particularly to FIG. 1, a housing 11 of a portable magnetic tape recorder is shown with a door 12 in closed position. Door 12 is provided with suitable hinge mechanisms not shown in the figure. In order to facilitate assembly of the housing and placement of the recording mechanism therein, housing 11 is preferably constructed of two general sections, a lower or bottom section 13 and an upper, or top, section 14. Removable panels 17 and 18 are provided at the lower end of the housing, one of which, panel 18, supports a cage for a plurality of small size dry cells. It will be understood that the housing is constructed of suitable insulating and protecting material, for example a synthetic plastic material.

A pair of brackets 21 and 22 are mounted on the housing at the top end for receiving a shoulder or neck strap so that the recorder can be supported therefrom to leave the operator free to use both hands for manipulation of a cine camera.

A microphone jack 23 and a remote control jack 24 are mounted in the upper end portion of housing 11. Their function will be described subsequently with particular reference to the recorder circuit shown in FIG. 12. The two jacks are of respectively different sizes for accommodation of a double plug as will be described subsequently.

A manual tape advance switch 27 is also mounted at the upper end of housing 11; the function of this switch will also be described subsequently with particular reference to the recorder circuit. An open channel portion is also provided at the top end of the housing; and a power cord 28 of the recorder may conveniently be coiled into this channel for storage while the recorder is not in use. Cord 28 is terminated by a two-conductor plug 29 for inner connecting the recorder and a camera as subsequently described. A signal lamp 31 is mounted on an upper front panel of the housing and functions in conjunction with a tape advance switch 27 as also subsequently described.

In FIG. 2, housing 11 is shown with door 12 opened. A conventional tape cassette, or cartridge, 42 available to the trade and now in wide use is shown in the housing. A spring hasp member 43 aids in positioning the cassette properly and, as will be explained further with reference to other figures, tape reel hubs and tape guides are so positioned in the housing as to be automatically engageable by mating portions of the cassette.

Door 12 is provided with two similar supporting and cam operating levers 44. These levers act as hinge supports for door 12 and also as cam operating members, as will be described in detail subsequently with particular reference to FIGS. 5 and 6.

An operator 47 for the first of the two interlock switches, switch 47′ (FIG. 12), is shown in FIG. 2; this is a door-operated button and is mounted in a face portion of housing 11 which is exposed when door 12 is open. When door 12 is closed, button 47 is depressed by engagement with the inner surface of the door to close switch 47′ in the power circuit of the recorder as will be described subsequently with particular reference to FIG. 12.

Figure 3:
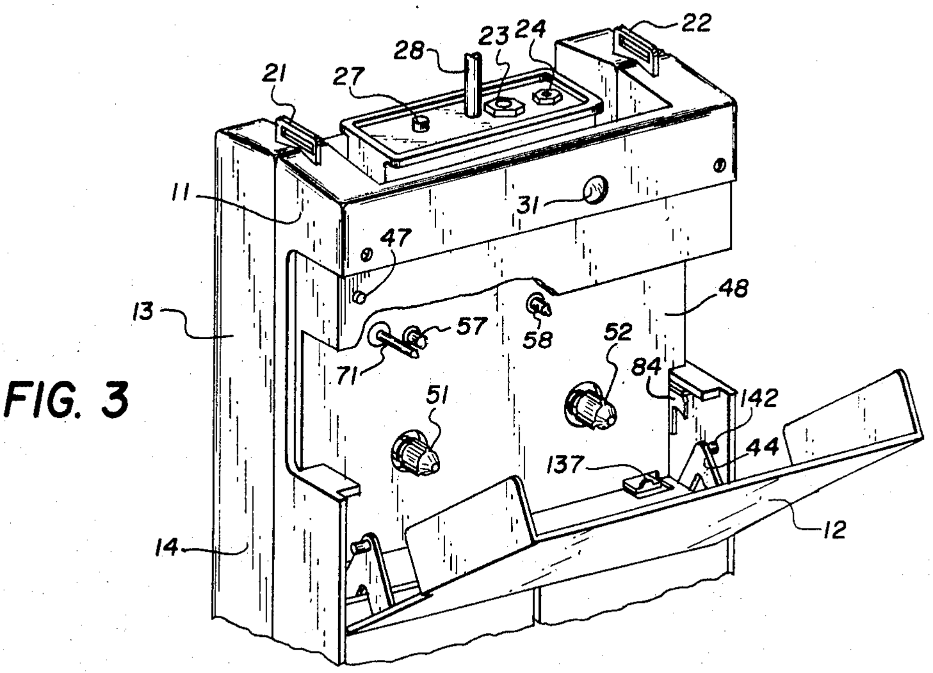
FIG. 3 is a fragmental view of the recorder shown in FIG. 2, the door being open and the cassette removed from the housing.

FIG. 3 shows a portion of the interior of housing 11 after removal of cassette 42. As shown, apertures are provided in an exposed table portion 48 of the housing interior to permit protrusion of tape reel hubs 51 and 52 of respective tape reel supports 53 and 54 (FIG. 4), tape guides 57 and 58, and driving capstan 71. All of these elements, as indicated previously, are in proper position to be automatically engaged by mating elements of the cassette, when the cassette is placed in the housing.

Figure 4:
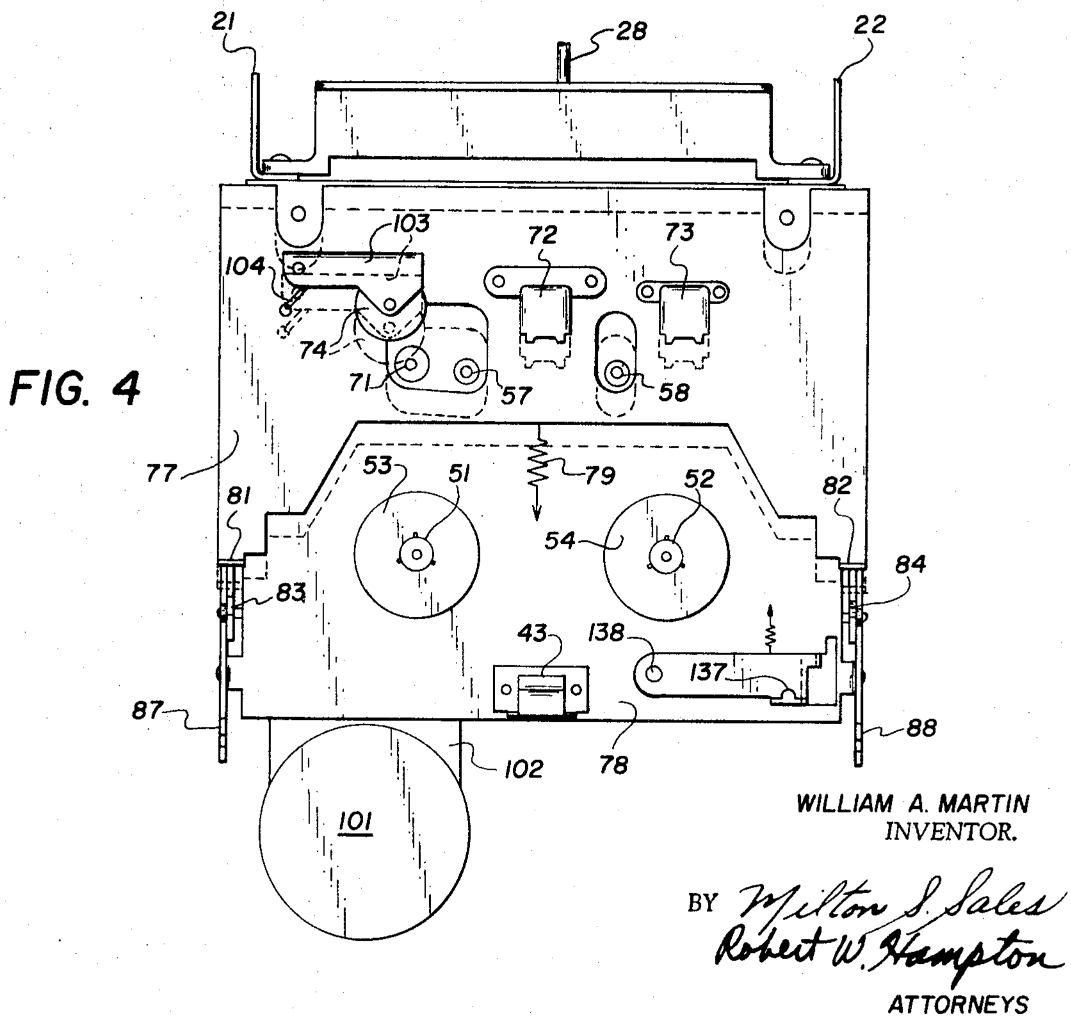
FIG. 4 is a front elevational view of some of the mechanism of the recorder shown in FIG. 1 showing particularly the tape supporting and guiding members, the record heads, the pressure roller, and the driving capstan.

Referring now to FIG. 4, a portion of the record mechanism is shown removed from the housing to disclose particularly the positioning of two record heads 72 and 73 and a pressure roller 74 on a movable carrier plate 77. Pressure roller 74 is rotatably supported in pivoted housing 103 which is biased in a clockwise direction around its supporting pivot by spring 104. These elements are shown in a "door open" position in full lines and in a 3 door closed" position in broken lines. Record head 72 is provided to record the audio program corresponding to a scene being photographed while head 73 records synchronization information transmitted for instance from a conventional sync pulse generator in the camera. Plate 77 is slidably mounted on a base plate 78 and is biased for movement toward the bottom end of plate 78 (as shown in FIG. 4) by suitable biasing springs as represented at 79. Suitable apertures are provided in plate 77 to permit protrusion of capstan 71 and tape guides 57 and 58, these three members being mounted on base plate 78.

Movable plate 77 is provided with upwardly projecting shoulders 81 and 82, one on each respective side edge; as will be described in detail subsequently. These shoulders are engaged by door operated cams 83 and 84, respectively, when the door is opened to move plate 77 back against the biasing action of the springs, thus permitting easy insertion and removal of cassettes. This "moved-back" position of plate 77 is shown in FIG. 4 and it will be observed that record heads 72 and 73 are moved back from the "tape path" defined by the tape guides 57 and 58, and that pressure roller 74 is moved back from capstan 71.

The mechanism for moving plate 77 is better seen in FIGS. 5 and 6. Two similar support and cam operating levers are attached to the inner surface of door 12 near the respectively opposite sides thereof; one of these levers, lever 44, is shown in FIGS. 5 and 6, and it will be understood that the companion lever (not shown) is similar in arrangement and similarly positioned at the opposite side of the door. Each of these arms carries two projecting pins such as pins 142 and 143 of lever 44. A support bracket is mounted on each side edge of base plate 78, i.e. support brackets 87 and 88 (FIG. 4). As best shown in FIGS. 5 and 6, door 12 is movably supported on housing 11 by positioning a projecting pin of each lever in the cut-out portion provided at the upper edge of each support bracket; thus pin 143 of lever 44 is positioned in the cut-out portion of bracket 88.

When door 12 has been closed, both supporting and cam operating levers are in similar positions; the closed position of lever 44 is as shown in FIG. 5 and it will be understood that the corresponding lever at the opposite side of the door is in similar position. For purposes of simplified disclosure, only the operation of one lever, i.e. lever 44, and the associated cam will be described. As previously described, for example with reference to FIG. 4, movable plate 77 is biased for forward movement by biasing springs herein referred to by numeral 79. Upright shoulders 81 and 82 carried by the plate engage either one of two straight sides of respective cams 83 and 84. As shown, these two straight sides are at right angles to each other and are joined at a common point. When the door is closed, as represented in FIG. 5, the respective cams 83 and 84 are in the rotated position which permits plate 77 to be moved to its forward position by the action of the biasing springs.

Assuming now that door 12 is opened, supporting and cam operating lever 44 is rotated in a counterclockwise direction about pin 143. As this rotation takes place, pin 142, also mounted on lever 44, engages the cut-out surface of cam 84 and, as the generally upward movement of pin 142 continues, cam 84 is rotated in a clockwise direction about its mounting pin and assumes the position shown in FIG. 6. Due to the configuration of cam 84, plate 77 is pushed back against the biasing force of the spring by engagement of the cam surface with shoulder 82 of the plate. It will be observed that, for the door-open position of cam 84 shown in FIG. 6, plate 77 has been moved back substantially from the closed-door position of FIG. 5. The forward position of FIG. 5 is the "working" position while the back position of FIG. 7 is the "loading and unloading" position.

Assuming now that door 12 starts to close, clockwise rotation of lever 44 from the solid line position of FIG. 6 brings pin 142 into engagement (broken line position) with the upper surface of the "claw" portion of cam 84. As the generally downward movement of pin 142 continues, cam 84 is rotated in a counterclockwise direction about its pivot until the closed-door position of FIG. 5 is again reached and plate 77 has moved forward under the biasing force of the spring.

It will be apparent from the above that the novel arrangement is such that simple and efficient means has been provided whereby the record heads and pressure roller, while automatically placed in working position with respect to the cassette tape while the housing door is closed, are also automatically moved back out of such engagement position when the door is opened. This facilitates insertion and removal of the cassette without interference by the members mentioned and also safeguards the record heads against damage during loading or unloading. This is a particularly valuable feature in connection with a recorder intended primarily for use in the preparation of home sound motion pictures where the recorder may often be used under conditions which may be conducive to rough and even careless handling and where loading and unloading may be done while "on the move". The fact that in accordance with the present novel arrangement only a single movable plate is involved in the movement of the record heads and pressure roller and that no shifting of the position of the cassette tape before loading or unloading is required offers obvious valuable advantages over arrangements of the prior art intended for the same general application.

As shown most clearly in FIG. 7, a driving motor 101 is supported from base plate 78 y suitable bracket means 102. Motor 101 drives a pair of pulleys 107 and 108 via belt 111. Pulley 107 in turn is connected in driving relationship to tape take-up reel hub 51 (FIG. 4) while pulley 1–8 is connected in driving relationship to tape driving capstan 71 (also FIG. 4). Pulley 107 is pivotally mounted and is urged in a counterclockwise direction as viewed in FIG. 7 by a biasing spring 109 to tension belt 111. Pulley assembly 108 is designed to have sufficient inertia to assure an even, vibrationless drive for capstan 71. To simplify operation of the recorder, no provision has been made for rewinding the tape and tape supply reel hub 52 is not a driven element. After recording, the tape is not rewound but is processed directly from the take-up reel or spool.

As shown in this FIG. 7, a suitable wiring board 112 is suspended beneath base plate 78 for support of the various circuit elements, such as transistors, capacitors, resistors, etc, as well as the wiring for interconnecting such elements and the wiring terminals. These circuit elements will be further identified subsequently with particular reference to the circuit schematic, FIG. 12.

The bottom side of a housing 117 for holding a plurality of small dry cells is shown in FIG. 7, positive and negative terminals 118 and 131 also being shown. This housing is closed at the top side by panel 18 (FIG. 1).

Figures 8, 9:
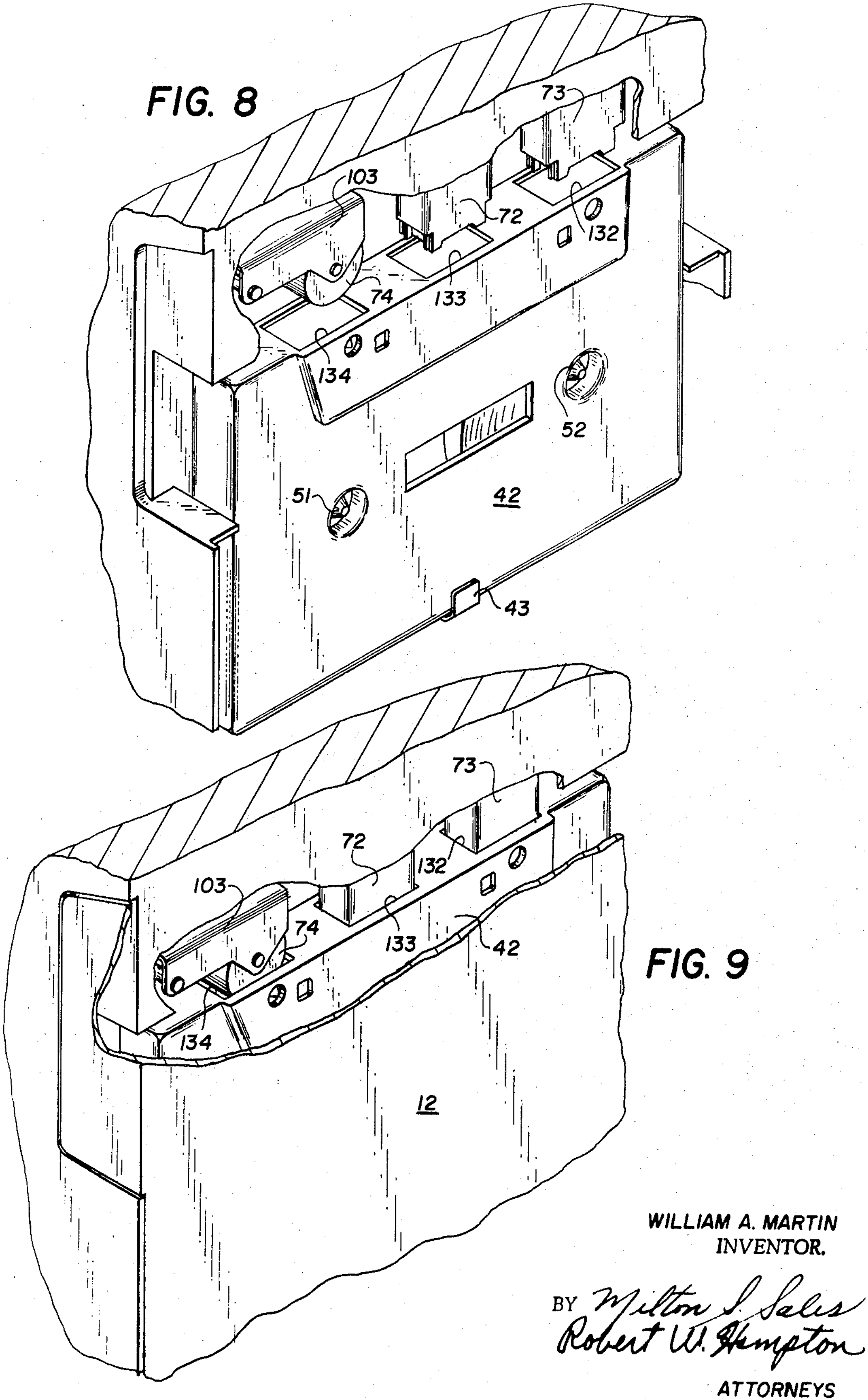
FIG. 8 is a fragmental view of a portion of the recorder with a cassette in position but with the record heads and pressure roller supporting plate in the "-back" position assumed when the door of the housing is open.
FIG. 9 is a view generally similar to that of FIG. 8 but with the supporting plate in the "forward" position assumed when the door of the housing is closed.

It will be assumed now, first with particular reference to FIG. 8, that a tape cartridge or cassette 42 is in record position in the housing with the forward edge of the cassette in engagement with hasp 43. Since the door 12 of the housing is assumed to still be open after loading the cassette, movable plate 77 is in its "pushed back" position and record heads 73 (pulse) and 72 (audio) and pressure roller 74 are not in engagement with the tape in the cassette. It will be observed that apertures 132, 133 and 134 are provided in the edge surface of cassette 42 for receiving record heads 73 and 72 and pressure roller 74, respectively, when housing cover 12 is closed and plate 77 moves forward to its normal position.

Figure 10:
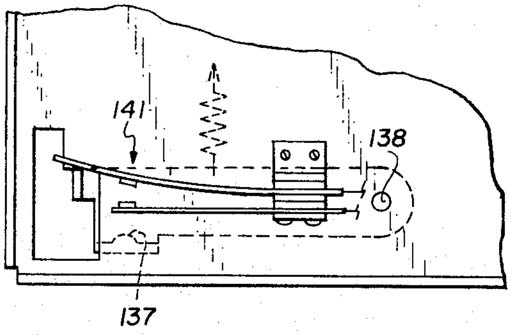
FIG. 10 shows the first interlock switch in open position.
Figure 11:
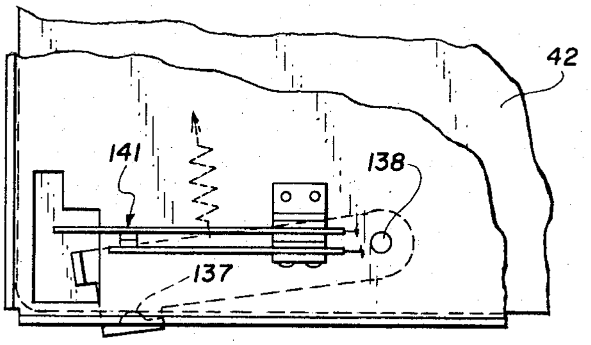
FIG. 11 shows the switch of FIG. 11 moved to a closed position by positioning of a cassette in the housing.

When cassette 42 is positioned in the housing, one corner edge thereof engages the head portion of a switch operating arm 137 (FIGS. 1, 2, 10 and 11) and rotates it in a counterclockwise direction about its supporting pivot 138 (FIGS. 10 and 11) to close a switch 141. When there is no cassette in the housing, switch operating arm 137 is held in the position shown in FIG. 10 by the contact spring tension and switch 141 is open or non-conducting. Switch 141 is the second of the interlock switches referred to hereinbefore and its function will be further explained subsequently with particular reference to FIG. 12. It might be mentioned at this point, however, that both the first interlock switch 47' and the second interlock switch 141 are included as series elements in the power supply path of the recorder from which it follows that the recorder cannot be operated unless two conditions prevail, first, a cassette must be in position in the recorder to close switch 141, and second, housing door 12 must be closed to close switch 47.

Assuming now that housing door 12 is closed and carrying plate 77 is moved forward to the position illustrated in FIG. 9 by the cam action described hereinbefore, record heads 73 and 72 are now brought into close contact with the magnetic tape as directed by tape guides 58 and 57, while pressure roller 74 is brought into position to engage the tape and press it into firm contact with driving capstan 71. Since capstan 71 is directly driven by motor 101, as previously mentioned, the tape is so moved by the capstan as to be withdrawn from the tape supply spool, or reel, engaged by hub 52 and fed to the tape take-up spool, or reel, engaged by hub 51. As also previously mentioned, supply reel hub 52 is moved only by the motion of the tape being withdrawn from the reel.

Preferably, the tape is sent to the processor with the exposed film from the camera so that the audio program recorded thereon can be transferred to a sound strip on the film by a known process. Therefore no rewind action is required and no provision has been made therefore. Further all playback capability has been omitted from the recorder and the plurality of switches usually found on a tape recorder are therefore absent, simplifying operation and eliminating the source of operator error. Unified control for both the camera and the recorder now becomes feasible.

Manual pre-advance of the tape is provided via tape advance switch 27 (FIGS. 1 and 2) whereby the tape leader may be initially advanced past the position of the record heads under control of the operator. This prevents inadvertent recording on the tape leader. The function of switch 27 will be further described subsequently with particular reference to FIG. 12.

The double interlock switching by which operation of the recorder and associated camera is prevented unless, first, a cassette is in position, and second, the housing door is closed, is also a feature of particular value for use under such general conditions. This double-interlock arrangement, as well as the common control arrangement for both camera and recorder, will be further described immediately below with particular reference to the schematic circuit showing of FIG. 12.

The above described interlocks and the removal of all functions and attendant control buttons commonly present in portable tape recorders, but not necessary for the present intended application, renders the mechanism practically free of possible operator error. The full portability of the device which permits its support by a shoulder or neck strap leads to unobtrusive use by the operator, particularly in view of the single control feature.

Figure 12:
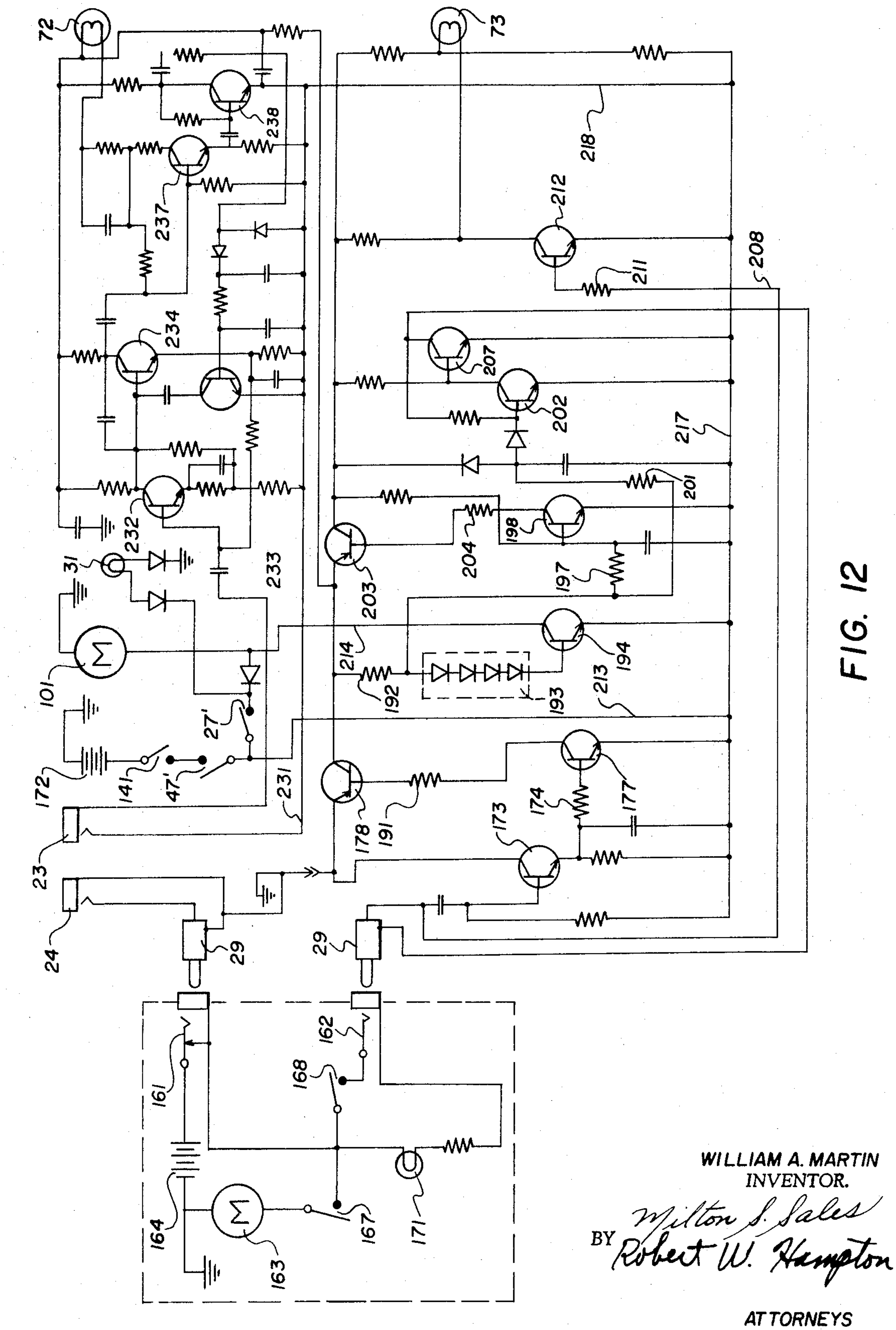
FIG. 12 is a schematic showing of the recorder circuit in accordance with the specific illustrative embodiment of the invention.

Referring now to FIG. 12, the circuit features of a movie camera of a type adapted for use in conjunction with a magnetic tape recorder of the nature contemplated by the present invention are shown schematically at the left of the drawing. The recorder is connected to the camera by insertion of either a single-circuit plug into jack 162, or, on occasion, by insertion of double-circuit plug 29 (FIG. 1) into respective jacks 161 and 162 of the camera circuit. Camera motor 163 is powered by battery 164 when the power path is closed at camera trigger switch 167. The camera is specially designed to include film pulldown switch 168 which is closed at each frame advance by for example a cam on the camera shutter shaft (not shown) to provide a synchronizing pulse to the recorder as further described below (the recorder is adapted for two-track recording on the cassette tape, a program track, and a synchronization track).

Operation

Assuming that the recorder and camera are connected, that cassette 42 is positioned in housing 11, and that door 12 of the housing is closed, switch 141 is closed through the engagement of the cassette edge with switch operating arm 137 (FIG. 11) and switch 47' is also closed. At this point, that is before camera trigger 167 is closed to start recording, manual tape advance switch 27' may be momentarily operated to close an operate path for recorder motor 101 from battery 172 through closed switches 141 and 47'. Motor 101 is operated for a short time period just sufficient to advance the leader portion of the cassette tape past record heads 72 and 73 before program recording is started. This action prevents inadvertent recording on the tape leader; while this operation continues, lamp 31 is lighted as an indicator of the action to the operator.

After the initial advance period referred to, switch 27' is released and camera trigger switch 167 may now be closed to start the actual recording of picture and sound. (It is assumed in the first instance that the common control of camera and recorder is by camera trigger 167; common control by microphone switch will be described later.)

A microphone is connected at jack 23 by a single circuit plug; jack 24 is not used at this time as dual control is by camera trigger 167. Accordingly, in this first instance double-circuit plug 29 is not utilized but instead a single circuit plug corresponding to the lower half of the plug is utilized and inserted into camera jack 162. It will be noted, that when a plug is not inserted in jack 161, the path is shortened at that point by contacts of the jack. Accordingly, upon closure of camera trigger 167, a path is closed for operating camera motor 163 from battery 164.

It will be noted that the recorder circuit comprises two general paths, the upper path for control of record head 72 for recording the audio program picked up by the microphone, and the lower path for control of record head 73 for recording the synchronizing pulses initiated by film pulldown switch 168.

Upon each closure of pulldown switch 168, a pulse is initiated in the lower half of the recorder circuit for activation of record head 73. Potential applied to the base of transistor 173 switches the transistor to ON condition. Current now flowing in the emitter-collector path of transistor 177 switching the transistor ON. Potential now applied to the base of transistor 178 through the emitter-collector path of transistor 177 and resistor 191 switches transistor 178 ON. Potential now applied through resistor 192 and diode group 193 to the base of transistor 194 switches this transistor ON; and potential applied through resistor 197 to the base of transistor 198 switches that transistor ON. Potential applied through resistor 201 to the base of transistor 202 switches that transistor to ON condition. Transistor 203 is switched to ON condition by potential applied to the base thereof through the emitter-collector path of transistor 198 and resistor 204, while potential supplied to the base of transistor 207 through the emitter-collector path of transistor 202 switches transistor 207 to ON condition. Also potential supplied via lead 208 and resistor 211 to transistor 212 switches that transistor to ON condition and paths are now closed for activation of record head 73 by the pulses initiated by pulldown switch 168.

Upon closure of the emitter-collector path of transistor 194 as discussed above, a path is completed for operation of the recorder motor 101 from battery 172 through closed switches 141 and 47', lead 213, emitter-collector path of transistor 194, lead 214 and motor 101 to ground. As discussed above, motor 101 drives tape drive capstan 71 and tape take-up reel hub 51. The tape is held in engagement with drive capstan 71 at this time by pressure roller 74 which is in its "forward" position so that the tape is now advanced from the supply reel of the cassette past the two record heads to the take-up reel of the cassette.

The audio program picked up by the microphone connected at jack 23 is applied via the upper portion of the recorder circuit for activation of record head 72. Microphone potential is obtained from battery 172 via leads 213, 217, 218 and 231.

Potential applied to the base of transistor 232 via lead 233 switches this transistor to ON condition and this is followed by the switching to ON condition of transistor 234 by potential applied to the base thereof through the emitter-collector path of transistor 232. Transistor 237 is switched ON by potential applied to its base through the emitter-collector part of transistor 234; and transistor 238, in turn, is switched to ON condition by potential supplied to its base through the emitter-collector path of transistor 237. Therefore, paths are now closed for application of the audio energy originated at the microphone to record head 72 for activation thereof.

As described above, it has been assumed that the dual control of camera and recorder is by camera trigger switch 167. In the event the control is to be by way of a remote microphone switch, both camera jacks 161 and 162 would be utilized and the two-circuit plug 29 would be used as shown. A simple "open-closed" path would be connected to jack 24 by a suitable plug. In practice, a two-circuit plug similar to plug 29 might be used instead of the two single-circuit plugs, one side of the plug containing the microphone connections and the other containing the switch connections.

When the plug conductor is inserted in jack 161, the short circuit provided by the jack contacts in the previous embodiment is removed. Camera trigger 167 is now latched in its closed position and its circuit controlling function is assumed by the on-off switch connected into the circuit by the plug inserted in jack 24. Circuit operations are otherwise as described above.

The invention has been described in detail with particular reference to preferred embodiments thereof, but it will be understood that variations and modifications can be effected within the spirit and scope of the invention.

I claim:

1. In a magnetic tape sound recorder including (1) means for receiving a cassette containing tape for recording sound; (2) a housing; (3) means in said housing defining a recess for receiving a tape cassette in recording position; (4) a door on said housing movable from a closed position covering said recess to an open position permitting reception of a cassette into said recess or removal of a cassette from said recess; (5) a plurality of tape guides in fixed positions within said housing to engage and guide the travel of the tape in a received cassette during recording; (6) a tape drive capstan; (7) at least one record head; (8) a pressure roller; and (9) a plate movable mounted in said housing, said record head and said pressure roller being supported by said plate for movement between first positions wherein said record head is in contact with the cassette tape and wherein said pressure roller is in engagement with the tape so as to cause engagement of the tape with said tape drive capstan, and second positions wherein said record head and said pressure roller are out of engagement with the tape; the improvement comprising means effective upon movement of said door to its closed position for moving said plate to effect movement of said record head and said pressure roller to said first positions said moving means comprising:

spring means for resiliently urging said plate in a direction for moving said record head and said pressure roller to said first positions; and means interconnecting said door and said plate to move said plate in a direction against the biasing action of said spring, said means interconnecting said door and said plate including (1) an abutment on said plate, (2) a cam member rotatably mounted on said housing and having two straight orthogonal sides joined at a common point, said cam member being rotatable from a first position wherein the first of said straight sides engages said abutment to a second position wherein the second of said straight sides engages said abutment, the displacement of said abutment and said plate resulting from engagement of said second of said straight sides with said abutment being substantially greater than that resulting from engagement of said first of said straight sides with said abutment, and (3) means effective upon movement of said door to its open position for rotating said cam member from the first position thereof to the second position thereof.

2. A magnetic tape sound recorder as defined by claim 1 wherein said means for rotating said cam member includes:

a cam surface on said cam member; and a lever movable with said door and having a pin thereon engageable in said cam surface upon movement of said door to its open position to move said cam member from the first position thereof to the second position thereof.

3. A magnetic tape sound recorder as defined by claim 2 wherein said lever movable with said door and having a pin thereon is also effective to move said cam member from the second position thereof to the first position thereof as said door is closed.

* * * * *